April 16, 1929. A. K. SUTHERLAND 1,709,288
STEMLESS CANOPY
Filed March 30, 1925

WITNESSES
M. E. Downey
C. L. Maal

INVENTOR
Alexander K. Sutherland
By R. S. Caldwell
ATTORNEY

Patented Apr. 16, 1929.

1,709,288

UNITED STATES PATENT OFFICE.

ALEXANDER K. SUTHERLAND, OF MILWAUKEE, WISCONSIN, ASSIGNOR TO MOE-BRIDGES COMPANY, OF MILWAUKEE, WISCONSIN, A CORPORATION OF WISCONSIN.

STEMLESS CANOPY.

Application filed March 30, 1925. Serial No. 19,410.

This invention relates to stemless canopies for electrical outlets and has for its object to provide a canopy for electric lighting fixtures which will avoid the necessity for the use of a stem providing limited movement of the canopy from the ceiling to permit work being done behind it and will instead be capable of movement the full length of the suspending chain.

Another object of the invention is to provide such a canopy with adjusting means compensating for varying lengths of attaching means to which it may be connected.

Another object of the invention is to provide means for holding the canopy against the ceiling and permitting of adjustment thereof to make a close-fitting connection.

Another object of the invention is to provide a canopy having a more ornamental appearance by avoiding the presence of an adjusting stem.

With the above and other objects in view the invention consists in the stemless canopy as herein claimed and all equivalents.

Figure 1:
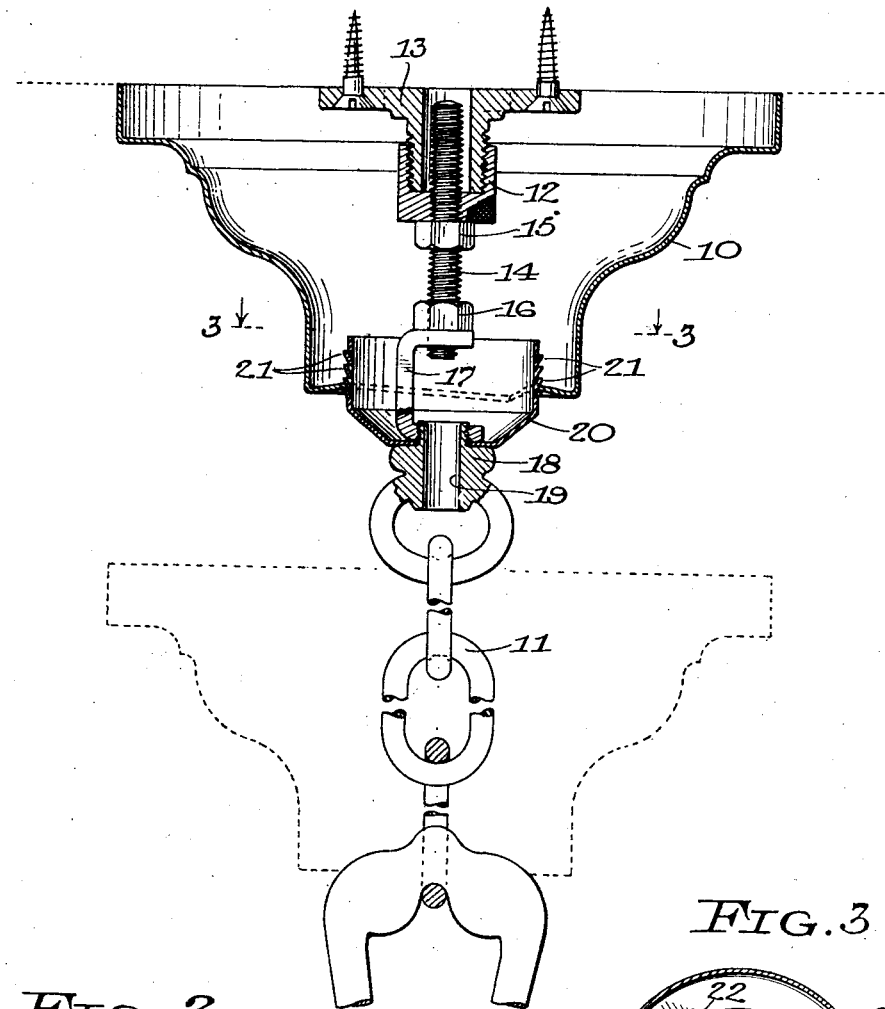
Figure 2:
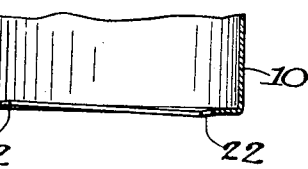
Figure 3:
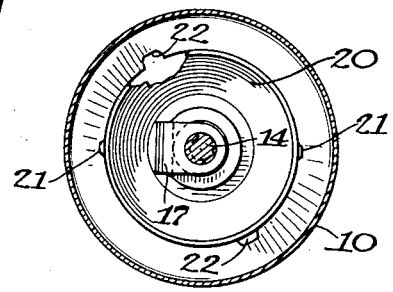

Referring to the accompanying drawings, in which like characters of reference indicate the same parts in different views, Fig. 1 is a sectional view of a stemless canopy constructed in accordance with this invention;

Fig. 2 is a sectional detail view of the lower edge of the canopy member showing the inclined screw thread formed thereby, and Fig. 3 is a sectional view on the plane of line 3—3 of Fig. 1, with a portion of the supporting member broken away.

In these drawings, 10 indicates a metal canopy, which, instead of fitting on a tubular stem with set-screw for holding it in place thereon, is provided with a central opening sufficiently large to permit it to freely pass over the chain 11.

The chain may be suspended in any desirable manner but the means shown is particularly suitable by reason of its adjustability. Such means consists of a screw cap 12 adapted to be threaded on a hickey 13 or the stub end of a gas pipe, and threaded through it is a screw shank 14 with a lock nut 15. Also threaded on the screw shank 14 of the lock nut 16 is a C-shaped connector 17, such threaded connection being formed with one of its arms, while the other arm has threaded in it the chain end 18 with the usual wire passageway 19 through it. Clamped between the shoulder portion of the chain end 18 and the connector 17 is a supporting member 20 of a size and shape to fit the opening of the canopy member and provided with one or more projections 21 which are cleared by the edge of the canopy member by means of notches 22 formed therein and are then engaged by such edge, which is inclined to form a screw-thread, as shown in Fig. 2, to cause an increasing clamping movement urging the canopy member toward the ceiling as the canopy member is turned around the supporting member. This projection and notch engagement between the canopy and supporting member is in effect a bayonet slot connection as well as a screw thread connection.

By means of this invention the presence of the usual stem is avoided with its tendency to become scratched and have its finish marred by the particles of loose plaster falling within the canopy; with its unsightly exposure when attached to a projecting pipe end; and with its limited provision for movement of the canopy when attached to a pipe end flush with or above the level of the ceiling. Instead the canopy is free to be turned to release it from its engagement with the supporting member and then it may freely be lowered over the chain the full length thereof, giving free access to the connections and adjustments which it normally conceals.

The proper positioning of the supporting member with respect to the surface of the ceiling may be accomplished irrespective of irregularities in the positioning of the pipe end or hickey to which the fixture is connected by reason of the adjustments of the screw shank 14 within the screw cap 12 and the connector 17, said adjustments when once effected being maintained by the lock nuts.

Not only does the present invention have the mechanical advantages above mentioned, but it presents a neat and ornamental appearance without parts liable to be scratched in the operation of raising and lowering the canopy.

What I claim as new and desire to secure by Letters Patent is:

1. A stemless canopy for electrical outlets comprising a screw cap, a screw shank threaded therein, a connector on the screw shank, a chain having its end connected to the connector, a supporting member clamped between the connector and the chain end and provided with projections, and a canopy member having an opening fitting on the supporting member and provided with notches in the edge of the opening to receive the projections, said edge of the opening being inclined to form a screw connection with the projections.

2. A stemless canopy for suspension chain lighting fixtures comprising a suitably mounted supporting member, a chain depending therefrom of smaller diameter, a canopy member having an opening fitting around the supporting member and capable of freely passing over the chain, and a series of projections on the supporting member, there being notches in the edges of the opening to receive the projections, and said edges of the opening being inclined to form a screw connection with the projections.

In testimony whereof, I affix my signature.

ALEXANDER K. SUTHERLAND.